US012775878B2

(12) United States Patent
Kakar et al.

(10) Patent No.: US 12,775,878 B2
(45) Date of Patent: Oct. 27, 2026

(54) SYNTHESIS OF PERSONA ATTRIBUTES

(71) Applicant: Perfecta Federal, LLC, Springfield, VA (US)

(72) Inventors: Jawad Kakar, Springfield, VA (US); George Zoulias, Springfield, VA (US)

(73) Assignee: Perfecta Federal, LLC, Springfield, VA (US)

( * ) Notice: Subject to any disclaimer, the term of this patent is extended or adjusted under 35 U.S.C. 154(b) by 210 days.

(21) Appl. No.: 18/228,632

(22) Filed: Jul. 31, 2023

(65) Prior Publication Data

US 2025/0045989 A1 Feb. 6, 2025

(51) Int. Cl.

*G06T 11/60* (2026.01)
*G06N 20/00* (2019.01)
*G10L 13/033* (2013.01)
*G10L 13/04* (2013.01)

(52) U.S. Cl.

CPC .............. *G06T 11/60* (2013.01); *G06N 20/00* (2019.01); *G10L 13/033* (2013.01); *G10L 13/04* (2013.01)

(58) Field of Classification Search

USPC .......................................................... 345/589
See application file for complete search history.

(56) References Cited

U.S. PATENT DOCUMENTS

| | | | |
|---|---|---|---|
| 9,779,327 | B2 | 10/2017 | Allen |
| 10,339,365 | B2 | 7/2019 | Gusarov |
| 10,832,589 | B1 | 11/2020 | Anzalone |
| 10,992,619 | B2 | 4/2021 | Antmen et al. |
| 12,283,363 | B2 | 4/2025 | Goncalves et al. |
| 2009/0157481 | A1 | 6/2009 | Jung |
| 2009/0157660 | A1 | 6/2009 | Jung |
| 2012/0059787 | A1 | 3/2012 | Brown et al. |
| 2013/0054366 | A1 | 2/2013 | Roundtree |
| 2013/0257877 | A1 | 10/2013 | Davis |

(Continued)

OTHER PUBLICATIONS

Nguyen, Tien-Dung, et al. "Avatar-machine learning pipeline evaluation using surrogate model." Advances in Intelligent Data Analysis XVIII, IDA 2020, Konstanz, Germany, Apr. 27-29, 2020, Proceedings 18. Springer International Publishing, 2020, pp. 352-365. (Year: 2020).

(Continued)

*Primary Examiner* — James A Thompson
*Assistant Examiner* — Kim Thanh T Tran
(74) *Attorney, Agent, or Firm* — Conley Rose, P.C.

(57) ABSTRACT

Methods, systems, and apparatus, including computer programs encoded on a computer storage medium, to synthesize persona attributes are disclosed. In one aspect, a method includes the actions of accessing training data that includes attributes. The actions further include accessing selection criteria that is configured to select a portion of the training data. The actions further include selecting the portion of the training data by applying the selection criteria to the training data. The actions further include training using machine learning, and using the portion of the training data, a model that is configured to generate given synthetic attributes of given synthetic personas. The actions further include providing, to the model, a request for synthetic attributes of synthetic personas. The actions further include receiving, from the model, the synthetic attributes of the synthetic personas.

18 Claims, 3 Drawing Sheets

(56) References Cited

U.S. PATENT DOCUMENTS

| | | | | |
|---|---|---|---|---|
| 2017/0053186 | A1 | 2/2017 | Allen | |
| 2018/0342095 | A1 | 11/2018 | Walsh | |
| 2019/0043239 | A1 | 2/2019 | Goel | |
| 2020/0351228 | A1 | 11/2020 | Dobrogost | |
| 2020/0387819 | A1* | 12/2020 | Rogynskyy | G06N 20/00 |
| 2021/0166459 | A1 | 6/2021 | Miller, IV | |
| 2021/0201003 | A1* | 7/2021 | Banerjee | G06V 10/82 |
| 2021/0327038 | A1* | 10/2021 | Helminger | G06T 9/002 |
| 2021/0409535 | A1 | 12/2021 | Mourkogiannis | |
| 2022/0122306 | A1* | 4/2022 | Lin | G06F 18/2163 |
| 2022/0309936 | A1 | 9/2022 | Jang | |
| 2022/0319078 | A1 | 10/2022 | Kozakov | |
| 2023/0088561 | A1* | 3/2023 | Ickin | G06N 3/098 706/12 |
| 2023/0140146 | A1 | 5/2023 | Ito et al. | |
| 2023/0334904 | A1 | 10/2023 | Monti | |
| 2023/0342487 | A1* | 10/2023 | Joseph | G06V 40/166 |
| 2024/0087272 | A1 | 3/2024 | Benzies | |
| 2024/0129437 | A1 | 4/2024 | Zhang | |
| 2024/0177283 | A1 | 5/2024 | Baimetov | |
| 2024/0193839 | A1 | 6/2024 | Khan et al. | |
| 2024/0249713 | A1 | 7/2024 | Suzuki | |
| 2024/0320519 | A1 | 9/2024 | Murugappan | |
| 2024/0386138 | A1* | 11/2024 | Rapowitz | G06N 20/00 |
| 2025/0299672 | A1 | 9/2025 | Suzuki et al. | |

OTHER PUBLICATIONS

U.S. Appl. No. 18/228,500, Office Action mailed May 19, 2025, 15 pages.

U.S. Appl. No. 18/228,500, Final Office Action mailed Jan. 16, 2026, 13 pages.

* cited by examiner

SYNTHESIS OF PERSONA ATTRIBUTES

TECHNICAL FIELD

This specification generally relates to personas, and, in more detail, to generating attributes of personas.

BACKGROUND

A persona may be a profile of a person. The persona may have various attributes that are also attributes of the person. The attributes may include data related to that person's interactions with various computing systems and non-computer related systems. The attributes may include demographic information of the person and/or the face and voice of the person. Attributes related to the person's interactions with various computing systems may include the person's information creation and sharing network accounts, the devices used to access those accounts, and how the person uses those accounts to interact with other individuals.

SUMMARY

In the world of personas, there may be instances where it is beneficial to create synthetic personas that appear to correspond to actual people. To build a synthetic persona, a user may need to create the various synthetic attributes that make up a synthetic persona. One of those synthetic attributes is an image of the face to correspond to the synthetic persona. One possible way to select an image of a face is to search various image databases for an image that fits the synthetic persona that the user is attempting to build. Simply selecting from images that already exist may cause the synthetic persona to appear fake because the image that corresponds to the persona can be found elsewhere. To improve the likelihood that the synthetic persona appears to belong to a real person, it would be beneficial to generate an image of a face that is unique.

To generate a unique image of a face, a user may interact with a computing device to select a set of training images of faces. The selected training images may include those faces that are similar to the one that the user wishes to generate. In some instances, the user may select to include all the training data without limiting the training images. The computing device may train a model using machine learning and the selected training images. With this model being trained using a specific set of selected training images, the model may generate similar images that are unique. The user may select one of the unique images for inclusion in a synthetic persona. The user may also interact with the model to further adjust various characteristics of the generates images. These characteristics may include color ranges of skin tone, color ranges of hair, color ranges of eyes, minimum frontal breadth, upper face height, height of forehead, face breadth, biogonia breadth (lower jaw width), height of lower face, total face height and/or any other similar characteristic.

An innovative aspect of the subject matter described in this specification may be implemented in methods that include the actions of accessing, by a computing device, training data that includes attributes of personas; accessing, by the computing device, selection criteria that is configured to select a portion of the training data; selecting, by the computing device, the portion of the training data by applying the selection criteria to the training data; training, by the computing device, using machine learning, and using the portion of the training data, a model that is configured to generate given synthetic attributes of given synthetic personas; providing, by the computing device and to the model, a request for synthetic attributes of synthetic personas; and receiving, by the computing device and from the model, the synthetic attributes of the synthetic personas These and other implementations can each optionally include one or more of the following features. The attributes of the personas are facial images of the persona. The selection criteria comprises color ranges of skin tone, color ranges of hair, color ranges of eyes, minimum frontal breadth, upper face height, height of forehead, face breadth, biogonia breadth, height of lower face, and total face height. The attributes of the persona are voices of the personas. The actions include bypassing, by the computing device, training the model using a remaining portion of the training data.

The actions include accessing, by the computing device, additional selection criteria that is configured to select an additional portion of the training data; selecting, by the computing device, the additional portion of the training data by applying the additional selection criteria to the training data; training, by the computing device, using machine learning, and using the additional portion of the training data, an additional model that is configured to generate given additional synthetic attributes of given additional synthetic personas; providing, by the computing device and to the additional model, an additional request for additional synthetic attributes of additional synthetic personas; and receiving, by the computing device and from the additional model, an additional selection of an additional synthetic attribute of the additional synthetic attributes for use in an additional synthetic persona. The portion of the training data and additional portion of the training data need not share any of the training data. The portion of the training data and additional portion of the training data may share some of the training data. The portion of the training data and the additional portion of the training data may be the same.

The action of selecting the portion of the training data by applying the selection criteria to the training data includes, based on the selection criteria, determining a range or threshold for a characteristic of the attributes; and for each attribute in the training data: determining a value of the characteristic of the attribute; comparing the value of the characteristic to the range or threshold; and based on comparing the value of the characteristic to the range or threshold, determining whether to select the attribute for inclusion in the portion of the training data. The actions include providing, by the computing device and to the model, a selection of a synthetic attribute of the synthetic attributes and a request to adjust a characteristic of the synthetic attribute; and based on the selection of the synthetic attribute and the request to adjust the characteristic of the synthetic attribute, receiving, by the computing device and from the model, an updated synthetic attribute.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Different attributes of a persona can be automatically generated and can be unique, which helps create a persona that appears to belong to an actual person.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
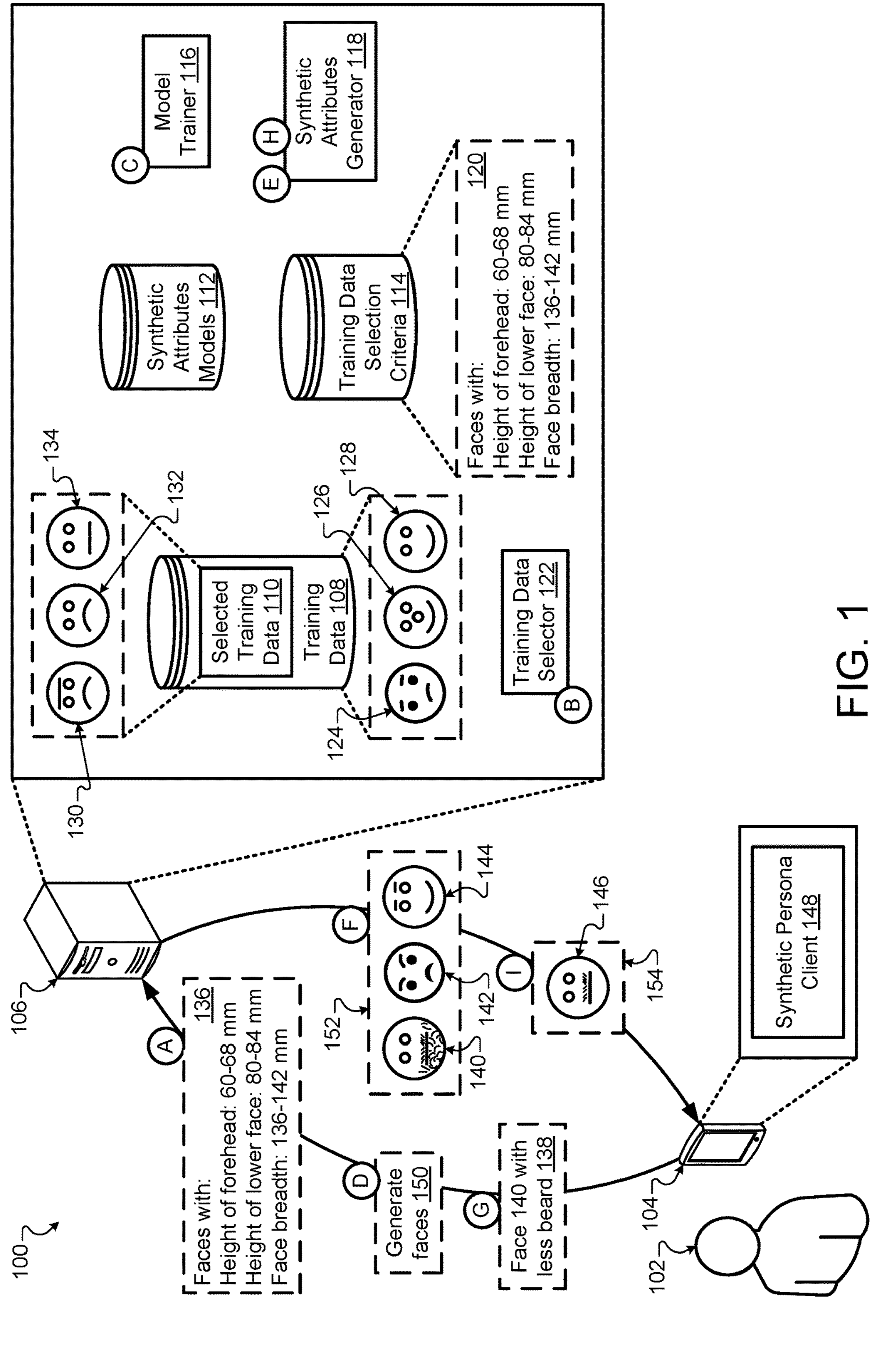
FIG. 1 illustrates an example system for training a model that is configured to synthesize attributes of a persona and using that model to synthesize attributes of personas.

FIG. 1 illustrates an example system 100 for training a model that is configured to synthesize attributes of a persona and using that model to synthesize attributes of personas. Briefly, and as described in more detail below, the user 102 may be interacting with the server 106 through the synthetic persona client 148 that may be running on the computing device 104. The user 102 may be attempting to generate a synthetic persona. To do so, the user 102 may generate some or all of the various attributes of the synthetic persona. One of those attributes may be the face of the synthetic persona. The server 106 may include various components to assist the user 102 in generating those attributes. FIG. 1 includes various stages A through H that may illustrate the performance of actions and/or the movement of data between various components of the system 100. The system 100 may perform these stages in any order.

In more detail, the user 102 may be interacting with the computing device 104. The computing device may include a synthetic persona client 148 that allows the user 102 to create complete synthetic personas and their various attributes. These personas are synthetic because they may not correspond to actual persons. The synthetic persona client 148 may assist the user 102 in creating the synthetic attributes that have a high likelihood of appearing to belong to personas that correspond to real people. The synthetic persona client 148 may communicate with the server 106. The server 106 may include various components that communicate with the synthetic persona client 148 that assist the user 102 in generating the synthetic attributes. These components may include the synthetic attributes generator 118 and the training data selector 122, which will be discussed in more detail below.

The computing device 104 and the server 106 may be any type of computing device that is configured to communicate with other computing devices. For example, the computing device 104 and/or the server 106 may be a desktop computer, a laptop computer, a tablet, a smart phone, a wearable device, a mainframe computer, and/or any other similar computing device. In some implementations, the computing device 104 and/or the server 106 may be a virtual computing devices that are hosted in the cloud in communication with disaggregated storage devices. In some implementations, the components of the computing device 104 and/or the server 106 may be implemented in a single computing device or distributed over multiple computing devices. In some implementations, the user 102 may be a computing device running an artificial intelligence program. In some implementations, the actions performed by the user 102 may be performed by more than one user.

The computing device 104 and the server 106 may each include a communication interface, one or more processors, memory, and hardware. The communication interface may include communication components that enable the computing device 104 or the server 106 to transmit data and receive data from other devices and networks. In some implementations, the communication interface may be configured to communicate over a wide area network, a local area network, the internet, a wired connection, a wireless connection, and/or any other type of network or connection. The wireless connections may include Wi-Fi, short-range radio, infrared, cellular, satellite, radio, and/or any other wireless connection.

The hardware may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

In stage A, the user 102 provides information to the synthetic persona client 148 and the server 106 to select the training data for the model used to generate the synthetic attributes. The one or more processors of the computing device 104 may implement the synthetic persona client 148. The information may include training parameters 136 that specify characteristics of the attributes used to train the model. In some implementations, the synthetic persona client 148 may generate a graphical interface that allows the user 102 to select the training parameters 136 from a group of available parameters. For example, the synthetic persona client 148 may generate an interface that allows the user 102 to select ranges and/or thresholds for various characteristics of the faces. These face characteristics may include the minimum frontal breadth, the upper face height, the total face height, the height of forehead, the face breadth, the height of lower face, the biogonia breadth (lower jaw width), and/or any other similar face measurements. The user 102 may select the height of forehead, height of lower face, and the face breadth as the measurements used to select the training data. The user 102 may specify that the height of forehead should be between 60 and 68 millimeters, the height of the lower face should be between 80 and 84 millimeters, and the face breadth should be between 136 and 142 millimeters. The synthetic persona client 148 may generate the training parameters 136 based on this input and transmit the training parameters 136 to the server 106.

The information that the user 102 provides to the synthetic persona client 148 may include measurements other than face measurements. The information provided may depend on the attribute that the user 102 is attempting to generate. The user 102 may provide data indicating the attribute that the user is attempting to generate. The user 102 may also provide data indicating the characteristic of the attribute for selecting the training data. In this case, the synthetic persona client 148 may provide an interface for the user 102 to select an attribute. In response to the selection, the synthetic persona client 148 may provide data indicating the available characteristics of that attribute. The user 102 may select a characteristic and the ranges and/or thresholds for that characteristics for limiting the training data for the attribute. Some of the attributes that make up a persona may include the voice of the persona, the interactions with various computing accounts associated with the persona, the devices used to access those computing accounts, and/or any other similar attributes. Each of these attributes may have various characteristics. For example, the voice may have pitch, timbre, tone, degree of hoarseness, and/or any other similar characteristic. The devices used to access the computing accounts may include a model number, manufacturer, operating system, installed applications, media access control address, international mobile equipment identity number, and/or any other similar characteristic.

The synthetic persona client 148 may provide the training parameters 136 to the server 106. The training data selector 122 of the server 106 may receive the training parameters 136 and store them in the training data selection criteria 114. The training data selector 122 may be implemented by one or processors of the server 106 executing software stored or accessible by the one or more processors. The training data selector 122 may use the training data selection criteria 114 to select a subset of training data from the training data 108. The training data 108 may include various attributes that may or may not belong to other personas. For example, the training data 108 may include various pictures of faces and the pictures may come from various sources. Some of the pictures may be included in other personas, either real or synthetic. Some of the pictures may be stock photos. Some of the pictures may be from various faces gathered from the internet. As another example, the training data 108 may include various voice samples from various sources. Some of the voice samples may be collected from video or audio clips accessible on the internet. Some of the voice samples may be included in video or audio clips of other personas.

In some implementations, the training data selector 122 may preprocess the attributes in the training data 108. The preprocessing step may involve analyzing each of the attributes in the training data 108 and determining a value for the various characteristics of the attribute. In the example of attributes that are faces, the training data selector 122 analyze each of the images of faces in the training data 108 and determine the value of the various characteristics of each face in each image. The training data selector 122 may calculate a value for skin tone, color ranges of hair, color ranges of eyes, minimum frontal breadth, upper face height, height of forehead, face breadth, biogonia breadth, height of lower face, total face height, and/or any other similar characteristics. In some implementations, the training data selector 122 may be unable to determine a characteristic value. In this case, the training data selector 122 may determine a likely range for the characteristic value based on the image. The training data selector 122 may determine a likely value for the characteristic value based on the image. In some implementations, these likely ranges or values may be based on other characteristics. For example, given values for the upper face height, height of forehead, and face breadth, the training data selector 122 may determine a likely range or likely value for the minimum frontal breadth. In some implementations, the training data selector 122 may determine a confidence score that reflects a likelihood that the correct value of the characteristics falls within the likely range or is the likely value.

In the example of FIG. 1 and in stage B, the training data selector 122 receives the training parameters 136 from the synthetic persona client 148. The training data selector 122 stores the training parameters 136 in the training data selection criteria 114 as the training criteria 120. The training data selector 122 determines that the training parameters 136 relate to the face attribute of a persona. In response to this determination, the training data selector 122 analyzes the face images in the training data 108. The training data includes face images 124, 126, 128, 130, 132, and 134. Each face image may include various metadata that includes values for the various characteristics of the face image. The training data selector 122 compares the training criteria 120 to the characteristics of the face images in the training data 108 and selects the face images in the training data 108 that meet the training criteria. Based on this comparison, the training data selector 122 determines whether the values of the characteristics of the face images in the training data 108 satisfy the training criteria 120. Based on determining that the values of the characteristics of the face images in the training data 108 satisfy the training criteria 120, the training data selector 122 may select face images 130, 132, and 134. The face images 130, 132, and 134 may be included in the selected training data 110.

In some instances, a value for a characteristic of the face images may be blank, have a likely value, or have a likely range. The likely values or ranges may have confidence scores associated with them. In some implementations, the training data selector 122 may bypass selecting a face image if the characteristic value is blank and the training data selector 122 is unable to determine that the characteristic value corresponds to the selection criteria 120. In some implementations, the training data selector 122 may select a face image if the characteristic value is blank and other characteristic values correspond to the selection criteria 120. In some implementations, the training data selector 122 may select a face image if the likely range of the characteristic overlaps a portion of the selection criteria 120. In some implementations, the training data selector 122 may select a face image if the likely range of the characteristic overlaps at least a threshold portion of the selection criteria 120, for example a fifty percent overlap.

The threshold may vary. The threshold may be user selectable and/or may vary based on the type of attribute. For example, the threshold for a face characteristic may be different than the threshold for a voice characteristic. The threshold may vary based on the type of characteristic. For example, the threshold for the height of forehead may be different than the threshold for the face breadth. The threshold may vary based on the confidence score associated with the likely value or likely range. The threshold may be indirectly related to the threshold such that a higher confidence score results in a lower threshold and a lower confidence score results in a higher threshold. In other words, as the confidence score increases, which indicates that the likely value or likely range is more likely to be accurate, the threshold may decrease.

With the selected training data 110 identified, the model trainer 116 may train a model that is configured to output one or more synthetic attributes that are the same type of attribute as the attributes in the selected training data 110. The model trainer 116 may train the model using machine learning. The model trainer 116 may store the trained model in the synthetic attributes models 112 along with data indicating the type of attribute that the model is configured to generate.

The models in the synthetic attributes models 112 may be configured to generate one or more synthetic attributes in response to receiving varying amounts of input. A first amount of input may be a request to generate multiple synthetic attributes. In response to this input, the model may be configured to output multiple synthetic attributes. The outputted multiple synthetic attributes may be different each time the model receives a request to generate multiple synthetic attributes. The outputted multiple synthetic attributes may also have different characteristics that may be similar to the characteristics of the selected training data 110. A second amount of input may be a request to generate multiple synthetic attributes and a specific range or value for one or more particular characteristics of the outputted multiple synthetic attributes. The outputted multiple synthetic attributes may also have different characteristics and may each have the one or more particular characteristics of the inputted value or range.

A third amount of input may be a request to modify an inputted attribute and generate one or more synthetic attributes. In response to this request to modify an inputted attribute and generate one or more synthetic attributes, the model may output one or more synthetic attributes that are similar to the inputted attribute. The one or more synthetic attributes may maintain one or more of the characteristics of the inputted attribute. A fourth amount of input may be a request to modify an inputted attribute, generate one or more synthetic attributes, and adjust a single characteristic of the inputted attribute. In response to the fourth amount of input, the model may output one or more synthetic attributes that maintain the characteristics of the inputted attribute with the exception of the single characteristic, which is adjusted as specified in the input.

In the example of FIG. 1 and in stage C, the model trainer 116 may train a model using the selected training data 110. The model trainer 116 may use machine learning to train the model and may store the model in the synthetic attributes models 112. The model may be configured to generate synthetic facial images because the selected training data 110 are facial images. The generated synthetic facial images may also have characteristics that are similar and/or that match the training criteria 120. Other characteristics that were not specified in the training criteria 120 may be in any range or value in the facial images in the selected training data 110.

With the model generated, the user 102 may attempt to generate synthetic attributes using the synthetic attributes models 112. The user 102 may interact with the synthetic persona client 148 on the computing device 104. The user may request multiple synthetic attributes and specify a type of attribute. The synthetic persona client 148 may generate an attribute request 150 and transmit the attribute request 150 to the server 106.

In some implementations, the synthetic persona client 148 may receive data indicating the synthetic attributes models 112 that are available to generate synthetic attributes. The synthetic persona client 148 may output an interface that allows the user 102 to select a type of synthetic attribute to generate from the available attributes. There may be more than one model that is configured to generate the same type of attribute. This may be the case because different sets of training data were used to train different models. The interface may further identify the training data used to train the corresponding model. The interface may indicate the training criteria used to select the training data. The interface may allow the user to view samples of the training data. The interface may include a name of the model that the user 102 may have provided during selecting of the training criteria. In response to the selection by the user 102 of a model, the synthetic persona client 148 may generate an attribute request 150 that reflects the selected attribute and includes a request to generate a synthetic attribute of the type of the selected attribute.

In the example of FIG. 1 and in stage D, the synthetic persona client 148 may receive data indicating that the synthetic attributes models 112 includes models for the persona attributes of faces, voices, and the interactions that the persona has with the various computing accounts associated with the persona. The user 102 may indicate to the synthetic persona client 148 that the user 102 would like to generate a synthetic attribute. In response, the synthetic persona client 148 may generate and output an interface that allows the user 102 to select from the available attributes that include faces, voices, and the interactions that the persona has with the various computing accounts associated with the persona. The user 102 may select the face attribute. The synthetic persona client 148 may generate the attribute request 150 that indicates to generate synthetic faces.

The synthetic attributes generator 118 may receive the attribute request 150 and access the corresponding model of the synthetic attributes models 112. The synthetic attributes models 112 may provide an input to the corresponding model that requests that the model output multiple synthetic attributes. The model may output the multiple synthetic attributes. In the example of FIG. 1 and in stage E, the synthetic attributes generator 118 may request that the model of the synthetic attributes models 112 that was trained using the selected training data 110 generate multiple images of synthetic faces.

The synthetic attributes generator 118 may receive the synthetic attributes from the model of the synthetic attributes models 112. The synthetic attributes generator 118 may generate a synthetic attribute packet 152 to provide to the synthetic persona client 148. The synthetic attribute packet 152 may include the synthetic attributes generated by the model or data identifying the synthetic attributes. In the example of FIG. 1 and in stage F, the synthetic attributes generator 118 may generate the synthetic attribute packet 152 that includes facial images 140, 142, and 144 and other facial images. The facial images 140, 142, and 144 and other facial images include faces generated by the model trained using the selected training data 110.

The synthetic persona client 148 may receive the synthetic attribute packet 152 and output the synthetic attributes 140, 142, and 144 on an interface on the display of the computing device 104. The interface may allow the user 102 to select one of the synthetic attributes. Selecting one of the synthetic attributes may mark the synthetic attribute for inclusion in a synthetic persona. Selecting one of the synthetic attributes may allow the user 102 to further refine the synthetic attribute as will be described below.

The synthetic persona client 148 may present the synthetic attributes 140, 142, and 144 and allow the user 102 to select one of the synthetic attributes and adjust one or more characteristics of the synthetic attribute. Upon selection of one of the synthetic attributes 140, 142, and 144, the synthetic persona client 148 may present the user with the various characteristics of the attribute. For example, if the synthetic attributes are faces, then the various characteristics may include skin tone, hair color, eye color, facial hair, frontal breadth, upper face height, height of forehead, face breadth, biogonia breadth, height of lower face, total face height, and/or any other similar facial characteristic. In some implementations, the interface may indicate the various values for each of the characteristics. The user 102 may input an adjustment to one or more characteristics. The synthetic persona client 148 may generate an attribute selection and adjustment packet 138 that identifies the selected attribute and indicates the adjustment requested by the user 102. For example, the hair color of the selected face may be dark brown. The user 102 may input an adjustment to change the hair color to light brown or input an adjustment amount to make the hair color lighter. The adjustment to make the hair color lighter may be set to a predetermined amount such that the hair color may be lightened, for example, by one level. The user 102 may specify to lighten the hair color by one or more levels. In some implementations, the predetermined amount may vary for each characteristic and/or may be user selectable.

In the example of FIG. 1 and stage G, the synthetic persona client 148 may present the face images 140, 142, and 144 on an interface of the computing device 104. The user may select image 140. Upon selection of the image 140, the synthetic persona client 148 may generate and output an interface that identifies the various characteristics of the image 140. This interface may or may not include the values of each characteristic. The user 102 may determine that the facial image 140 includes too much facial hair. The user 102 may select the facial hair characteristics and input a selection to reduce the amount of facial hair. The reduction amount may be a predetermined amount determined by the synthetic persona client 148. The synthetic persona client 148 may generate an attribute selection and adjustment packet 138 that identifies the image 140 and indicates the input from the user 102 to reduce the amount of facial hair by the selected amount. The synthetic persona client 148 may transmit the attribute selection and adjustment packet 138 to the server 106.

The synthetic attributes generator 118 may receive the attribute selection and adjustment packet 138. Based on the contents of the attribute selection and adjustment packet 138, the synthetic attributes generator 118 may determine the model of the synthetic attributes models 112 that generated the attribute 140. In some implementations, each synthetic attribute may include metadata that includes data identifying the model that generated the synthetic attribute. The synthetic attributes generator 118 may access the model that generated the identified attribute and provide the attribute, data identifying the characteristics to adjust and and the adjustment of the characteristic as inputs to the model. The adjustment of the characteristic may indicate an amount to adjust the characteristic. In some instances, the synthetic attributes generator 118 may provide a value for the characteristic in place or in addition to the adjustment to the characteristic. In some instances, the synthetic attributes generator 118 may provide an indication to increase or decrease the characteristic in accordance with the user selection. In this case, the model may determine an appropriate adjustment amount based on the training of the model.

In response to receiving the input that includes the identified attribute and the characteristic to adjust and some type of indication of how to adjust the characteristic or a value for the characteristic, the model outputs an updated attribute. The updated attribute may similar to the inputted attribute with the exception of the change to the characteristics. This does not necessarily mean that the other portion of the attribute will be identical to the inputted attribute or that even the values of the other characteristics will be the same as the characteristics of the inputted attribute. Instead, the model will generate a new synthetic attribute that has a high likelihood of appearing to resemble an attribute of an actual person, which may require that some of the characteristics of the inputted attribute may be different in than the characteristics of the new updated attribute.

In the example of FIG. 1 and in stage H, the synthetic attributes generator 118 receives the attribute selection and adjustment packet 138. The attribute selection and adjustment packet 138 indicates that the user 102 selects facial image 140 and would like a new similar facial image but with less facial hair. The synthetic attributes generator 118 identifies the corresponding model in the synthetic attributes models 112 that generated the facial image 140. The synthetic attributes generator 118 provides the model the facial image 140, data identifying the characteristic of facial hair, and a request to reduce the facial hair. The request to reduce the facial hair may or may not indicate an amount to reduce the facial hair. In this example, the request to reduce the facial hair does not include an amount. In response to the input, the model outputs a new synthetic facial image 146.

The synthetic attributes generator 118 generates an updated synthetic attribute packet 154 that includes the new synthetic attribute 146 and provides the updated synthetic attribute packet 154 to the synthetic persona client 148. The synthetic persona client 148 may output the new synthetic attribute 146 on a display or other output device of the computing device 104. The synthetic persona client 148 may generate and output an interface that allows the user to further adjust other characteristics of the new synthetic attribute 146, which may result in another cycle of stages G and H. The user 102 may also select the new synthetic attribute 146 for inclusion in a synthetic persona.

In the example of FIG. 1 and in stage I, the synthetic attributes generator 118 generates the updated synthetic attribute packet 154 that includes the new synthetic facial image 146. The synthetic persona client 148 outputs the new synthetic facial image 146 on the display of the computing device 104. The synthetic persona client 148 may generate and output an interface that allows the user 102 to select the facial image 146 for inclusion in a synthetic persona or further adjust any of the characteristics of the facial image 146. The user 102 may select to include the facial image 146 in the synthetic persona. The user 102 may repeat the process illustrated by stages A through I for additional synthetic attributes of the synthetic persona.

Figure 2:
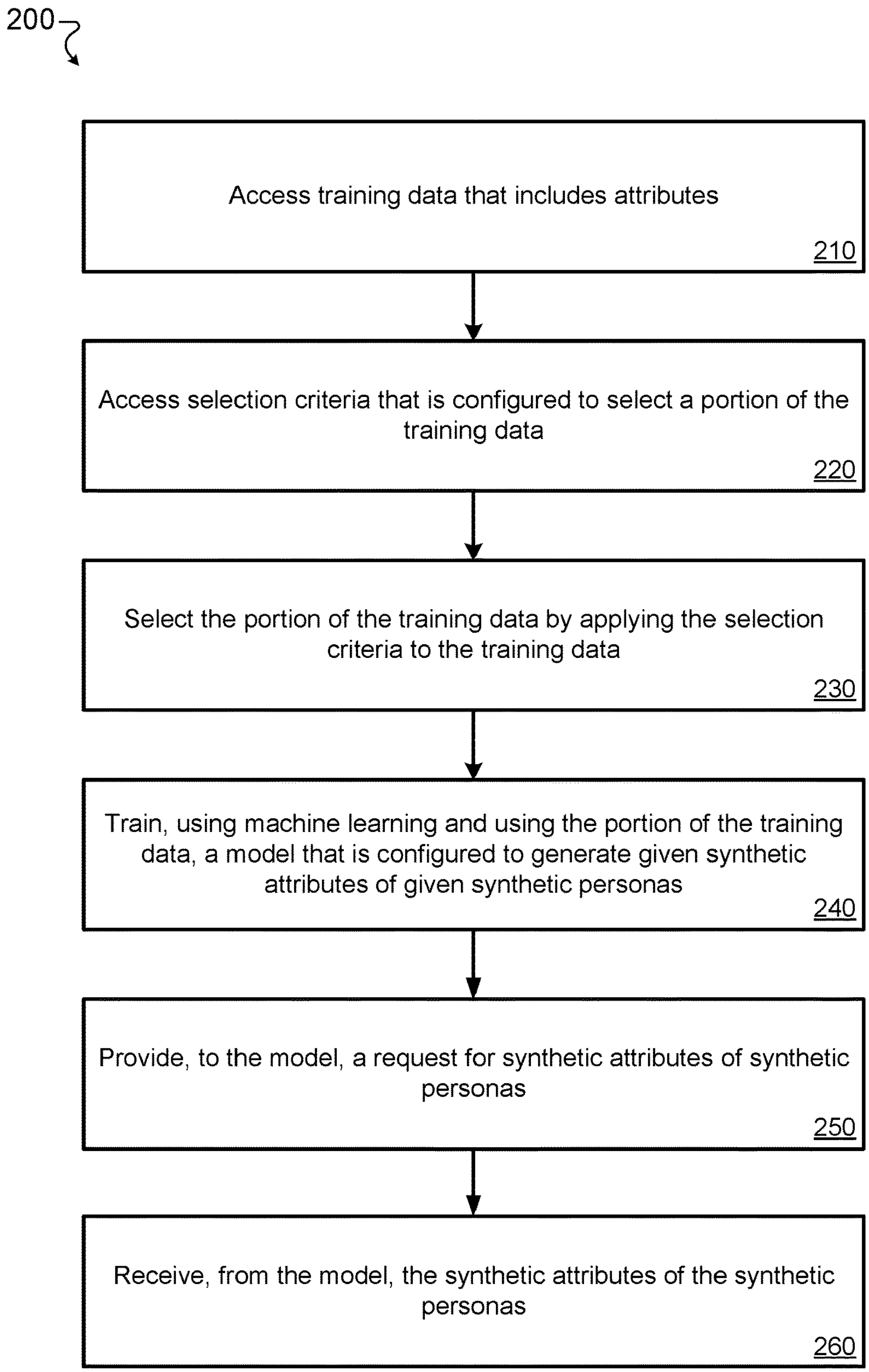
FIG. 2 is a flowchart of an example process for training a model that is configured to synthesize attributes of persona.

FIG. 2 is a flowchart of an example process 200 for training a model that is configured to synthesize attributes of persona. In general, the process 200 accesses data that includes various attributes that may or may not be included in personas. The process 200 selects a portion of that data and trains a model using the portion of the data. The model is configured to generate new synthetic attributes. The process 200 uses the model to generate and then further update new synthetic attributes. The process 200 will be described as being performed by the server 106 of FIG. 1 and will include references to other components in FIG. 1. In some implementations, the process 200 may be performed by one or more computing devices, including virtual computing devices.

The server 106 accesses training data 108 that includes attributes (210). In some implementations, the attributes of the personas are facial images of the persona. In some implementations, the attributes of the personas are voices of the personas. The server 106 may collect attributes from crawling the internet, from stock photo, voice, or other attributes sources, and/or from any other similar source. In some implementations, the attributes may or may not include attributes of personas. In some implementations, the attributes may be similar to the attributes used in persona. In the example of attributes being faces, the training data 108 may include images of faces where at least one eye is showing. The server 106 accesses selection criteria that is configured to select a portion of the training data (220). In some implementations, the selection criteria comprises color ranges of skin tone, color ranges of hair, color ranges of eyes, minimum frontal breadth, upper face height, height of forehead, face breadth, biogonia breadth, height of lower face, total face height, and/or any other similar characteristics. This may be the case if the attributes are faces.

The server 106 selects the portion of the training data by applying the selection criteria to the training data (230). In some implementations, the user 102 provides the ranges and/or thresholds for the characteristics of the attributes in the training data. Based on these ranges and/or thresholds, the server 106 may select the portion of the training data by comparing the values of the characteristics of the training data to the ranges and/or thresholds. If the values of the characteristics of the training data satisfies the ranges and/or thresholds, then the server 106 includes that attribute in the portion of the training data.

In some implementations, the server 106 may generate the ranges and/or thresholds based on a quality provided by the user 102. In this case, the user 102 may not specify a range and/or threshold for a characteristic. Instead, the server 106 may generate the threshold and/or ranges based on the quality provided by the user 102. For example, the user 102 may provide an input that the training data should include facial images of people who are elderly. Based on this quality, the server 106 may generate various ranges and/or thresholds for characteristics such as hair color, teeth color, skin elasticity, and/or any other similar characteristics. The server 106 may perform searches on various databases and/or the internet using the terms included in the quality provided by the user 102 and terms related to the attribute. For example, the server 106 may search the internet for "elderly faces." The server 106 may analyze the results returned from the searches and determine various ranges and/or thresholds for characteristics that may appear to be common in the results. The server 106 may apply these ranges and/or thresholds to the training data in a similar manner as described above.

The server 106 trains using machine learning, and using the portion of the training data, a model that is configured to generate given synthetic attributes of given synthetic personas (240). The server 106 may bypass training a model using the remaining portion of the training data.

The server 106 provides, to the model, a request for synthetic attributes of synthetic personas (250). In some implementations, this request is in response to input from the user 102 requesting synthetic attributes. In some implementations, the request may specify for the model to generate multiple synthetic attributes. In some implementations, the request may specify which model to use in generating the synthetic attributes.

The server 106 receives, from the model, the synthetic attributes of the synthetic personas (260). The server 106 may output the synthetic attributes to a computing device 104 of the user 102. The user 102 may select one of the synthetic attributes for inclusion in a synthetic persona. In some implementations, the user 102 may further adjust the characteristics of a selected synthetic attribute as described below in relation to FIG. 3.

In some implementations, the server 106 may generate additional models using the training data. The server 106 may receive additional selection criteria. Based on this additional selection criteria, the server 106 may select an additional portion of the attributes in the training data. The additional portion may or may not include some of the attributes in the portion used to train the other model. The server 106 may train an additional model using the additional portion of the attributes. The server 106 may then use that additional model to generate other attributes. The server 106 may label each model based on the training data to identify them for later use in generating synthetic attributes.

Figure 3:
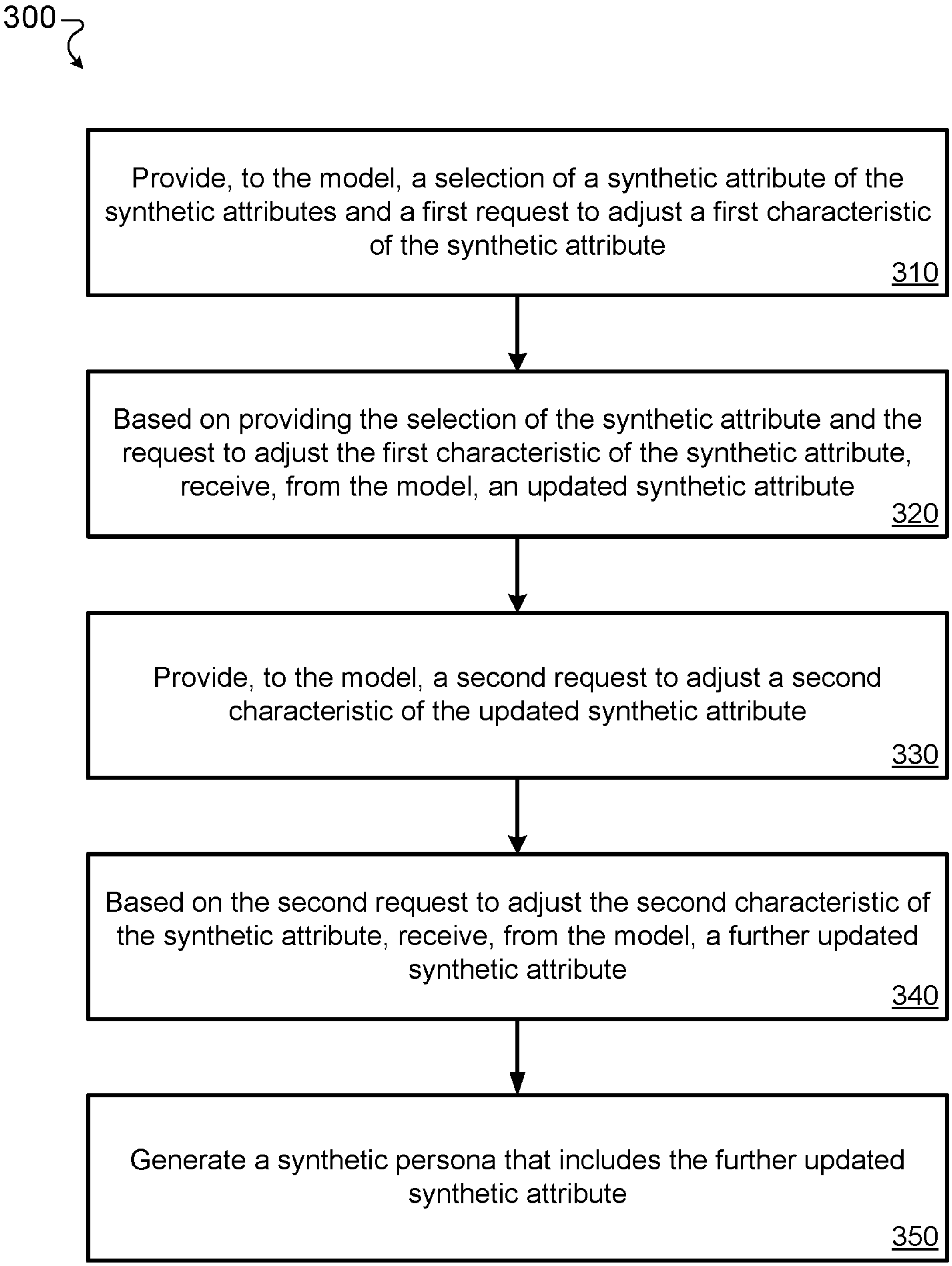
FIG. 3 is a flowchart of an example process for using a model to synthesize attributes of personas.

FIG. 3 is a flowchart of an example process 300 for using a model to synthesize attributes of personas. In general, the process 300 selects a synthetic attribute generated from a model. The process 300 further updates that synthetic attribute by specifying a characteristics to change in the synthetic attribute and requesting that the model update the synthetic attribute. That back and forth continues until the process 300 determines that the updated synthetic attribute is sufficient for inclusion in a synthetic persona. The process 300 will be described as being performed by the server 106 of FIG. 1 and will include references to other components in FIG. 1. In some implementations, the process 300 may be performed by one or more computing devices, including virtual computing devices.

The server 106 provides, to the model, a selection of a synthetic attribute of the synthetic attributes and a first request to adjust a first characteristic of the synthetic attribute (310). In some implementations, the first request to adjust the first characteristic includes a value to adjust the first characteristic and a direction, such as increase or decrease, for the value. In some implementations, the first request to adjust the first characteristic includes a request to change the value in one direction or another without specifying the amount of adjustment. In this case, the model may determine an adjustment amount during generation of the updated synthetic attribute. In some implementations, the first request to adjust the first characteristic does not include a specific value to change the first characteristic. Instead, the value to change is predetermined based on the characteristic. For example, a request to darken skin color may be predetermined to be two shades of darkening. A request to increase minimum frontal breadth may be predetermined to be one millimeter of increase.

Based on providing the selection of the synthetic attribute and the request to adjust the first characteristic of the synthetic attribute, the server 106 receives, from the model, an updated synthetic attribute (320). The server 106 may output the updated synthetic attribute to the computing device 104 of the user 102. In some implementations, the server 106 may output data indicating the values of the various characteristics of the updated synthetic attribute. The server 106 may also output data indicating how the user 102 has requested to update the various characteristics of the synthetic attribute. This way the user 102 may have an indication of the characteristics that the user 102 has adjusted and an amount that the user 102 has adjusted those characteristics since the model initially output the multiple synthetic attributes.

The server 106 provides, to the model, a second request to adjust a second characteristic of the updated synthetic attribute (330). The user 102 may request to further adjust another characteristic. In some implementations, the user 102 may request to further adjust the same, first characteristic. In some implementations, the second request to adjust the second characteristic includes a value to adjust the second characteristic and a direction, such as increase or decrease, for the value. In some implementations, the second request to adjust the second characteristic includes a request to change the value in one direction or another without specifying the amount of adjustment. In this case, the model may determine an adjustment amount during generation of the further updated synthetic attribute. In some implementations, the second request to adjust the second characteristic does not include a specific value to change the second characteristic. Instead, the value to change is predetermined based on the type of characteristic.

Based on the second request to adjust the second characteristic of the synthetic attribute, the server 106 receive, from the model, a further updated synthetic attribute (340). The server 106 may output the further updated synthetic attribute to the computing device 104 of the user 102. In some implementations, the server 106 may output data indicating the values of the various characteristics of the further updated synthetic attribute. The server 106 may also output data indicating how the user 102 has requested to update the various characteristics of the synthetic attribute. This way the user 102 may have an indication of the characteristics that the user 102 has adjusted and an amount that the user 102 has adjusted those characteristics since the model initially output the multiple synthetic attributes.

The server 106 generates a synthetic persona that includes the further updated synthetic attribute (350). Once the user 102 is satisfied with the synthetic attribute and does not wish to further adjust any of the characteristics, the user 102 may include the further updated synthetic attribute in a synthetic persona.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
- accessing, by a computing device, training data that includes attributes;
- accessing, by the computing device, selection criteria that is configured to select a portion of the training data;
- selecting, by the computing device, the portion of the training data by applying the selection criteria to the training data;
- training, by the computing device, using machine learning, and using the portion of the training data, a model that is configured to generate given synthetic attributes of given synthetic personas;
- providing, by the computing device and to the model, a request for synthetic attributes of synthetic personas; and
- receiving, by the computing device and from the model, the synthetic attributes of the synthetic personas,
- wherein the training data includes images and selecting the portion of the training data by applying the selection criteria to the training data comprises:
  - analyzing, by a training data selector, the images in the training data for characteristics of the attributes, one or more of the images each having an attribute in common;
  - determining, by the training data selector, the value of the characteristic of the attribute in each of the one or more images;
  - based on the selection criteria, determining a range or threshold for the characteristic; and
  - for each of the one or more images in the training data:
    - comparing the value of the characteristic to the range or threshold; and
    - based on comparing the value of the characteristic to the range or threshold, determining whether to select the attribute for inclusion in each of the one or more images.

2. The method of claim 1, wherein the attributes of the personas are facial images of the persona.

3. The method of claim 2, wherein the selection criteria comprises color ranges of skin tone, color ranges of hair, color ranges of eyes, minimum frontal breadth, upper face height, height of forehead, face breadth, bigonia breadth, height of lower face, and total face height.

4. The method of claim 1, wherein the attributes of the persona are voices of the personas.

5. The method of claim 1, comprising:
- if the training data selector is unable to determine the value of the characteristic, bypassing, by the computing device, training the model using a remaining portion of the training data.

6. The method of claim 1, comprising:
- accessing, by the computing device, additional selection criteria that is configured to select an additional portion of the training data;
- selecting, by the computing device, the additional portion of the training data by applying the additional selection criteria to the training data;
- training, by the computing device, using machine learning, and using the additional portion of the training data, an additional model that is configured to generate given additional synthetic attributes of given additional synthetic personas;
- providing, by the computing device and to the additional model, an additional request for additional synthetic attributes of additional synthetic personas; and
- receiving, by the computing device and from the additional model, an additional selection of an additional synthetic attribute of the additional synthetic attributes for use in an additional synthetic persona.

7. The method of claim 6, wherein the portion of the training data and additional portion of the training data do not share any of the training data.

8. The method of claim 6, wherein the portion of the training data and additional portion of the training data share some of the training data.

9. The method of claim 1, comprising:
- providing, by the computing device and to the model, a selection of a synthetic attribute of the synthetic attributes and a request to adjust a characteristic of the synthetic attribute; and
- based on the selection of the synthetic attribute and the request to adjust the characteristic of the synthetic attribute, receiving, by the computing device and from the model, an updated synthetic attribute.

10. A system, comprising:

one or more processors; and memory including a plurality of computer-executable components that are executable by the one or more processors to perform a plurality of actions, the plurality of acts comprising:

accessing, by a computing device, training data that includes attributes;

accessing, by the computing device, selection criteria that is configured to select a portion of the training data;

selecting, by the computing device, the portion of the training data by applying the selection criteria to the training data;

training, by the computing device, using machine learning, and using the portion of the training data, a model that is configured to generate given synthetic attributes of given synthetic personas;

providing, by the computing device and to the model, a request for synthetic attributes of synthetic personas; and receiving, by the computing device and from the model, the synthetic attributes of the synthetic personas, wherein the training data includes images and selecting the portion of the training data by applying the selection criteria to the training data comprises:

analyzing, by a training data selector, the images in the training data for characteristics of the attributes, one or more of the images each having an attribute in common;

determining, by the training data selector, the value of the characteristic of the attribute in each of the one or more images;

based on the selection criteria, determining a range or threshold for the characteristic; and for each of the one or more images in the training data:

comparing the value of the characteristic to the range or threshold; and based on comparing the value of the characteristic to the range or threshold, determining whether to select the attribute for inclusion in each of the one or more images.

11. The system of claim 10, wherein:

the attributes of the personas are facial images of the persona, and the selection criteria comprises color ranges of skin tone, color ranges of hair, color ranges of eyes, minimum frontal breadth, upper face height, height of forehead, face breadth, bigonia breadth, height of lower face, and total face height.

12. The system of claim 10, wherein the attributes of the persona are voices of the personas.

13. The system of claim 10, wherein the plurality of acts comprise:

if the training data selector is unable to determine the value of the characteristic, bypassing, by the computing device, training the model using a remaining portion of the training data.

14. The system of claim 10, wherein the plurality of acts comprise:

accessing, by the computing device, additional selection criteria that is configured to select an additional portion of the training data;

selecting, by the computing device, the additional portion of the training data by applying the additional selection criteria to the training data;

training, by the computing device, using machine learning, and using the additional portion of the training data, an additional model that is configured to generate given additional synthetic attributes of given additional synthetic personas;

providing, by the computing device and to the additional model, an additional request for additional synthetic attributes of additional synthetic personas; and receiving, by the computing device and from the additional model, an additional selection of an additional synthetic attribute of the additional synthetic attributes for use in an additional synthetic persona.

15. The system of claim 14, wherein the portion of the training data and additional portion of the training data do not share any of the training data.

16. The system of claim 14, wherein the portion of the training data and additional portion of the training data share some of the training data.

17. The system of claim 10, wherein the plurality of acts comprise:

providing, by the computing device and to the model, a selection of a synthetic attribute of the synthetic attributes and a request to adjust a characteristic of the synthetic attribute; and based on the selection of the synthetic attribute and the request to adjust the characteristic of the synthetic attribute, receiving, by the computing device and from the model, an updated synthetic attribute.

18. One or more non-transitory computer-readable media of a computing device storing computer-executable instructions that upon execution cause one or more computers to perform acts comprising:

accessing, by a computing device, training data that includes attributes;

accessing, by the computing device, selection criteria that is configured to select a portion of the training data;

selecting, by the computing device, the portion of the training data by applying the selection criteria to the training data;

training, by the computing device, using machine learning, and using the portion of the training data, a model that is configured to generate given synthetic attributes of given synthetic personas;

providing, by the computing device and to the model, a request for synthetic attributes of synthetic personas; and receiving, by the computing device and from the model, the synthetic attributes of the synthetic personas, wherein the training data includes images and selecting the portion of the training data by applying the selection criteria to the training data comprises:

analyzing, by a training data selector, the images in the training data for characteristics of the attributes, one or more of the images each having an attribute in common;

determining, by the training data selector, the value of the characteristic of the attribute in each of the one or more images;

based on the selection criteria, determining a range or threshold for the characteristic; and for each of the one or more images in the training data:

comparing the value of the characteristic to the range or threshold; and based on comparing the value of the characteristic to the range or threshold, determining whether to select the attribute for inclusion in each of the one or more images.

* * * * *